(12) United States Patent
Chan et al.

(10) Patent No.: US 7,684,331 B2
(45) Date of Patent: Mar. 23, 2010

(54) SCHEDULING PACKET TRANSMISSION

(75) Inventors: Carri Chan, Stanford, CA (US); Susie J. Wee, Palo Alto, CA (US); John G. Apostolopoulos, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 380 days.

(21) Appl. No.: 11/787,609

(22) Filed: Apr. 16, 2007

(65) Prior Publication Data

US 2008/0253372 A1    Oct. 16, 2008

(51) Int. Cl.
*H04L 12/26* (2006.01)
(52) U.S. Cl. .................................. 370/235; 370/395.4
(58) Field of Classification Search ........................ None
See application file for complete search history.

(56) References Cited

U.S. PATENT DOCUMENTS

| | | | |
|---|---|---|---|
| 6,047,000 A | 4/2000 | Tsang et al. | |
| 6,661,797 B1 | 12/2003 | Goel et al. | |
| 7,106,366 B2 * | 9/2006 | Parker et al. | ............. 348/222.1 |
| 2002/0008994 A1 | 1/2002 | Lisi et al. | |

FOREIGN PATENT DOCUMENTS

| | | |
|---|---|---|
| JP | 11032013 A | 2/1999 |
| JP | 2001007889 A | 7/2001 |

* cited by examiner

*Primary Examiner*—Kwang B Yao
*Assistant Examiner*—Alex Skripnikov

(57) ABSTRACT

Scheduling packet transmission. A plurality of data packets is received, wherein at least a portion of the plurality of data packets is associated with one media unit and comprises different quality information. Profit-to-size ratios or distortion-to-size ratios for the data packets are determined. A plurality of schedules of the data packets are determined utilizing dynamic programming for a plurality of data rates based at least in part on the profit-to-size ratios or distortion-to-size ratios.

18 Claims, 6 Drawing Sheets

400

```
┌─────────────────────────────────────────────────────────────┐
│ Receive a plurality of data packets comprising at least a   │
│ subset of data packets, wherein the subset of data packets  │
│ is associated with one media unit and comprises different   │
│ quality information.                                         │
│ 410                                                          │
└─────────────────────────────────────────────────────────────┘
                              │
                              ▼
┌─────────────────────────────────────────────────────────────┐
│ Determine profit-to-size ratios for the data packets.       │
│ 420                                                          │
└─────────────────────────────────────────────────────────────┘
                              │
                              ▼
┌─────────────────────────────────────────────────────────────┐
│ If a lower quality level packet associated with the media    │
│ unit has a larger profit-to-size ratio than a higher quality │
│ layer packet associated with the media unit, fuse the lower  │
│ quality layer packet and the higher quality layer packet    │
│ into a fused packet.                                         │
│ 430                                                          │
└─────────────────────────────────────────────────────────────┘
                              │
                              ▼
┌─────────────────────────────────────────────────────────────┐
│ Determine a plurality of schedules of the data packets for  │
│ a plurality of data rates based at least in part on the     │
│ profit-to-size ratios utilizing dynamic programming.        │
│ 440                                                          │
│  ┌────────────────────────────────────────────────────────┐ │
│  │ Determine a plurality of schedules of the data packets │ │
│  │ for a plurality of data rates based at least in part   │ │
│  │ on a quality information precedence constraint of the  │ │
│  │ data packets, wherein a schedule comprising a higher   │ │
│  │ quality level packet associated with the media unit    │ │
│  │ also comprises at least a lower quality level packet   │ │
│  │ associated with the media unit.                        │ │
│  │ 442                                                     │ │
│  └────────────────────────────────────────────────────────┘ │
│  ┌────────────────────────────────────────────────────────┐ │
│  │ Utilizing dynamic programming to determine the         │ │
│  │ plurality of schedules.                                │ │
│  │ 450                                                     │ │
│  │  ┌──────────────────────────────────────────────────┐  │ │
│  │  │ Arrange data packets in order of profit-to-size  │  │ │
│  │  │ ratio.                                            │  │ │
│  │  │ 452                                               │  │ │
│  │  └──────────────────────────────────────────────────┘  │ │
│  │  ┌──────────────────────────────────────────────────┐  │ │
│  │  │ Solve the PCKP for the data packets.             │  │ │
│  │  │ 454                                               │  │ │
│  │  └──────────────────────────────────────────────────┘  │ │
│  └────────────────────────────────────────────────────────┘ │
└─────────────────────────────────────────────────────────────┘
                              │
                              ▼
┌─────────────────────────────────────────────────────────────┐
│ Determine a set of embedded schedules based at least in     │
│ part on the plurality of schedules, wherein an embedded     │
│ schedule for a particular rate comprises packets for the    │
│ particular rate and packets for lower rates.                │
│ 460                                                          │
└─────────────────────────────────────────────────────────────┘
```

```
┌─────────────────────────────────────────────────────────────┐
│ Receive a first data packet and a second data packet        │
│ associated with one media unit, wherein the first data      │
│ packet comprises lower quality information than the         │
│ second data packet.                                         │
│ 510                                                         │
└─────────────────────────────────────────────────────────────┘
                              │
                              ▼
┌─────────────────────────────────────────────────────────────┐
│ Determine profit-to-size ratios for the first data packet   │
│ and the second data packet.                                 │
│ 520                                                         │
└─────────────────────────────────────────────────────────────┘
                              │
                              ▼
┌─────────────────────────────────────────────────────────────┐
│ If the first data packet has a larger profit-to-size ratio  │
│ than the second data packet, fuse the first data packet     │
│ and the second data packet into a fused data packet.        │
│ 530                                                         │
└─────────────────────────────────────────────────────────────┘
                              │
                              ▼
┌─────────────────────────────────────────────────────────────┐
│ Determine a signal-to-noise ratio for the fused data packet.│
│ 540                                                         │
└─────────────────────────────────────────────────────────────┘
                              │
                              ▼
┌─────────────────────────────────────────────────────────────┐
│ Utilize the fused packet in determining a plurality of      │
│ schedules of data packets for a plurality of data rates     │
│ based at least in part on profit-to-size ratios utilizing   │
│ dynamic programming.                                        │
│ 550                                                         │
└─────────────────────────────────────────────────────────────┘
```

FIG. 5

SCHEDULING PACKET TRANSMISSION

FIELD

Various embodiments of the present invention relate to the field of streaming media.

BACKGROUND

Wireless streaming environments present many challenges for the system designer. For instance, clients can have different display, power, communication, and computational capabilities. In addition, wireless communication links can have different maximum bandwidths, quality levels, and time-varying characteristics. A successful wireless video streaming system must be able to stream video to heterogeneous clients over time-varying wireless communication links, and this streaming must be performed in a scalable manner. Scalability is needed to enable streaming to a multitude of clients with different device capabilities.

Streaming media delivery systems typically code media streams once and then stream it to receivers under different network conditions. Currently, typical media delivery systems transmit data in order of resolution, from lowest to highest, scanning from top to bottom. The order of packet transmission is referred to as a schedule.

Often, packets are transmitted over noisy, time-varying channels. In these situations, it is desirable to be able to quickly adapt the media for the different network conditions, and to do so in a manner that provides the highest quality media possible for each rate.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4 is a flowchart illustrating a process for scheduling data packet transmission, in accordance with one embodiment of the present invention.

FIG. 5 is a flowchart illustrating a process for fusing data packets, in accordance with one embodiment of the present invention.

The drawings referred to in this description should not be understood as being drawn to scale except if specifically noted.

DESCRIPTION OF EMBODIMENTS

Various embodiments of the present invention, scheduling packet transmission, are described herein. In accordance with one embodiment of the present invention, a method for scheduling packet transmission is provided. A plurality of data packets is received, wherein at least a portion of the plurality of data packets is associated with one media unit and comprises different quality information. Profit-to-size ratios or distortion-to-size ratios for the data packets are determined. A plurality of schedules of the data packets are determined utilizing dynamic programming for a plurality of data rates based at least in part on the profit-to-size ratios or distortion-to-size ratios. Distortion and profit are two ways of referring to the value of a packet. It should be appreciated that while the embodiments of the present invention are described in the context of profit, embodiments of the present invention may also utilize distortion as well. Distortion and profit refer to quantified measures of distortion, such as squared error or sum of absolute differences, or perceptual measures of distortion, or any other expression for the absolute or relative importance of a media packet.

Reference will now be made in detail to various embodiments of the present invention, examples of which are illustrated in the accompanying drawings. While the present invention will be described in conjunction with the various embodiments, it will be understood that they are not intended to limit the invention to these embodiments. On the contrary, embodiments of the present invention are intended to cover alternatives, modifications and equivalents, which may be included within the spirit and scope of the appended claims. Furthermore, in the following description of various embodiments of the present invention, numerous specific details are set forth in order to provide a thorough understanding of embodiments of the present invention. In other instances, well known methods, procedures, components, and circuits have not been described in detail as not to unnecessarily obscure aspects of the embodiments of the present invention.

Embodiments of the present invention provide for scheduling packet transmission. In various embodiments, subsets of packets, also referred to as schedules, are selected for minimizing distortion subject to varying rate constraints. Embodiments of the present invention utilize dynamic programming to determine a plurality of schedules for transmitting packets at different transmission rates. In one embodiment, dynamic programming is utilized to solve a Precedence Constraint Knapsack Problem (PCKP) considering the dependencies of certain types of packets for the schedules at a plurality of transmission rates. In one embodiment, embedded schedules are generated by fusing together particular packets.

Figure 1A:
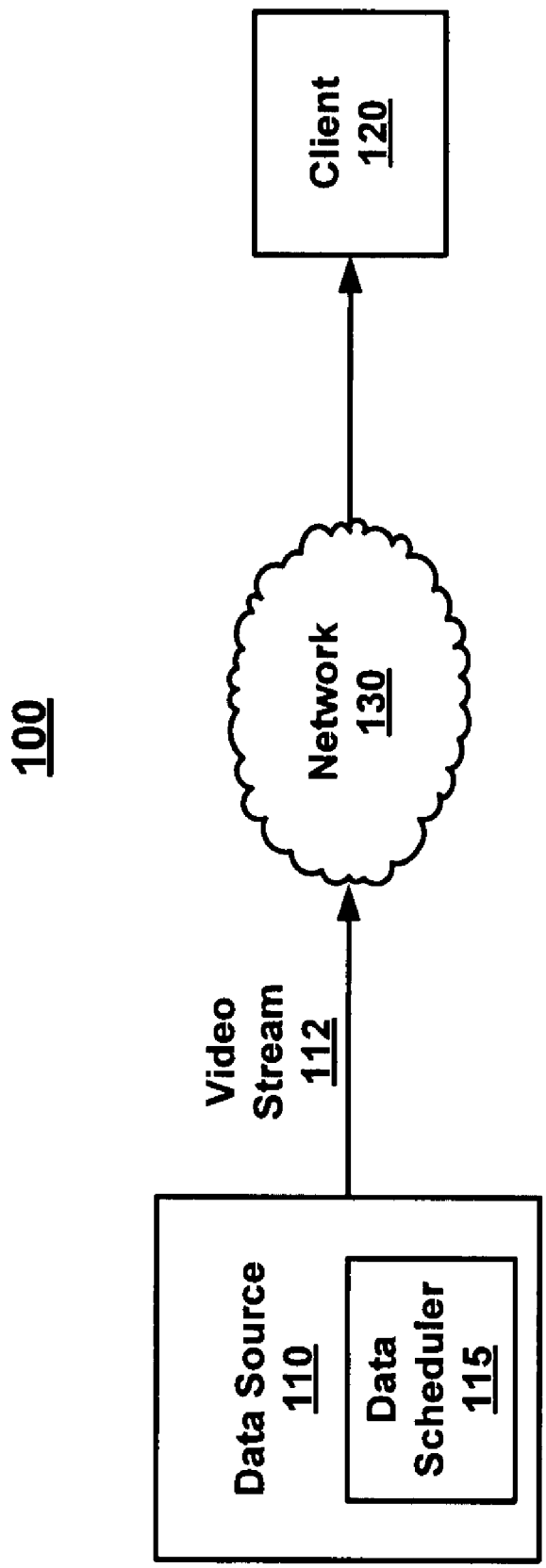
FIGS. 1A and 1B are block diagrams of example systems upon which various embodiments of the present invention may be practiced.
Figure 1B:
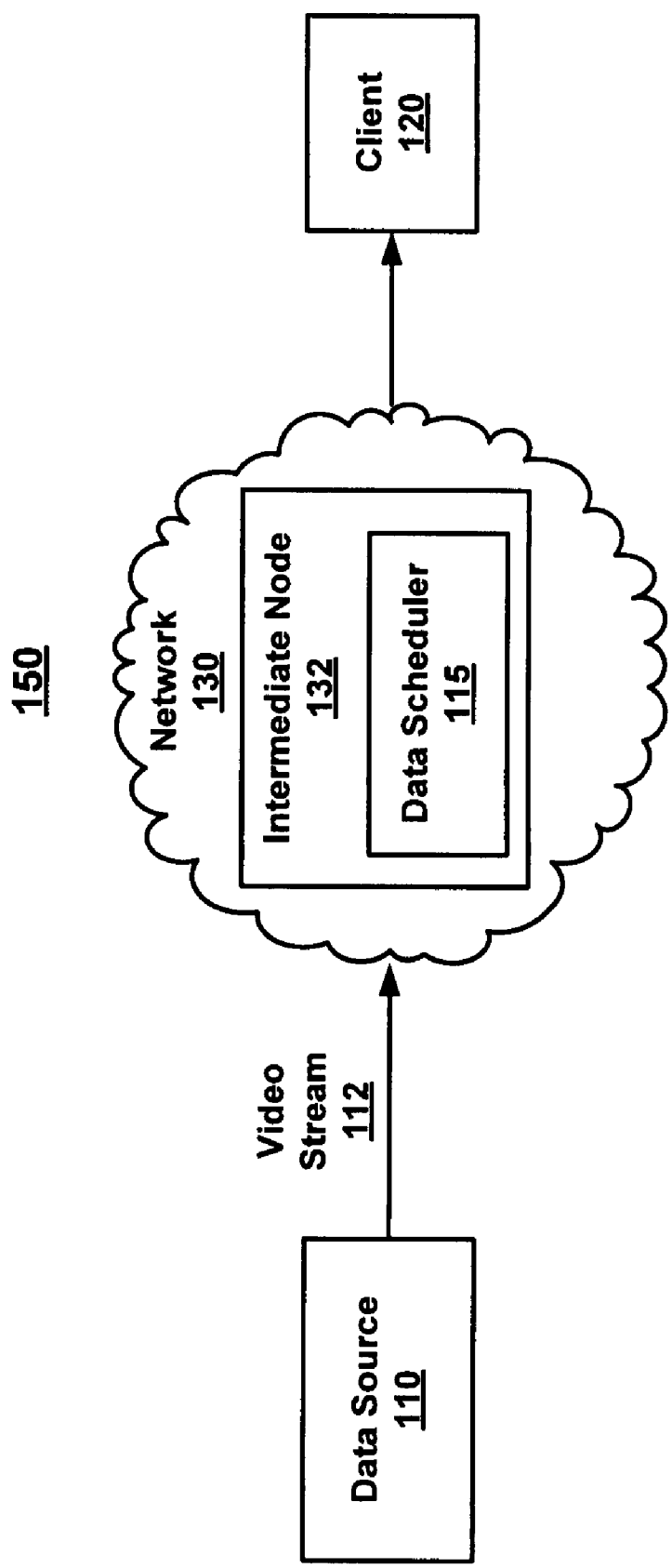

FIGS. 1A and 1B are block diagrams of example systems upon which various embodiments of the present invention may be practiced. With reference first to FIG. 1A, system 100 is shown, in accordance with an embodiment of the present invention. System 100 includes data source 110 and client 120 communicatively coupled over network 130. Data source 110 includes data scheduler 115. In system 100, media (e.g., video, images, audio, graphics, text, data) data is streamed to clients, e.g., client 120, via a wired or wireless link. In one embodiment, data scheduler 115 is operable to generate at least one packet transmission schedule for use in transmitting data packets. It should be appreciated that data scheduler 115 can be implemented as software, hardware, firmware, or any combination thereof. Moreover, it should be appreciated that system 100 may include additional components that are not shown so as to not unnecessarily obscure aspects of the embodiments of the present invention.

Although the embodiments of the present invention are described with respect to the streaming of video data, it should be understood that embodiments of the present invention are not limited to the streaming of video data. It should be appreciated that embodiments of the present invention also apply to other types of media, including without limitation: audio-based data, image-based data, graphics data, video-based data, text-based data, web page-based data, and the like.

In the present embodiment, data source 110 generates a video stream 112 that is sent to client 120 over network 130. In one embodiment, data source 110 includes a transcoder (not shown) for transcoding video stream 112 into a lower-bandwidth video stream. It should be appreciated that the transcoder can be located at any node between data source 110 and client 120, e.g., an intermediate transcoding node within network 130.

With reference first to FIG. 1B, system 150 is shown, in accordance with another embodiment of the present invention. System 150 includes data source 110 and client 120 communicatively coupled over network 130. Network 130 includes intermediate node 132 including data scheduler 115. In one embodiment, intermediate node 132 includes a transcoder (not shown) for transcoding video stream 112 into a lower-bandwidth video stream. In system 150, media (e.g., video) data is streamed to clients, e.g., client 120, via a wired or wireless link. In one embodiment, data scheduler 115 is operable to generate at least one packet transmission schedule for use in transmitting data packets. It should be appreciated that the components of system 150 operate in a similar manner as the corresponding components of system 100 of FIG. 1A. System 150 illustrates a different configuration of the components of system 100.

Referring to FIGS. 1A and 1B, both systems 100 and 150 use data scheduler 115 to generate schedules for the transmission of packets using a plurality of transmission rates. In general, streaming media delivery systems typically code media streams once and then stream it to receivers under different network conditions. In these systems, it is desirable to be able to quickly adapt the media for the different network conditions, and to do so in a manner that provides the highest quality media possible for each rate. Scalable coding schemes enable adaptation by allowing rate reduction to be performed by simply discarding data units from the coded media stream. For instance, embodiments of data scheduler 115 are operable to determine which data units to drop to achieve the highest quality possible.

Embodiments of the present invention determine a subset of packets, e.g., a schedule, of a media stream that should be selected to achieve a specified transmission rate. In one embodiment, a schedule includes only full packets. In one embodiment, all packets are independent of each other, in which rate and distortion are purely additive across different packets. However, this is generally not the case as most compression standards introduce dependencies between coded packets. Despite the dependencies, a schedule, S(R), can be found for a given rate R, using the Precedence Constraint Knapsack Problem (PCKP). An efficient algorithm exists that solves PCKP in $\Theta(kR)$ where k is the total number of packets and R is the rate constraint. However, PCKP only finds S(R) for a single rate R. Embodiments of the present invention find schedules for a plurality of rates, e.g., r=1, 2, 3, . . . , R with byte-level granularity, using this solution requires R executions of the PCKP algorithm and a resultant running time of $\Theta(kR^2)$. Embodiments of the present invention provide a more efficient determination of the same schedules as in PCKP, but computes it with a running time of $\Theta(kR)$.

Embodiments of the present invention utilize scalable coding standards, e.g., JPEG-2000 scalable image coding, MPEG-4 Scalable Video Coding, H.264 Scalable Video Coding, MPEG Scalable Advanced Audio Coding (Scalable AAC), scalable vector graphics (SVG), and proprietary scalable coding methods. Embodiments of the present invention also utilize coding methods that traditionally are not referred to as scalable such as JPEG, MPEG-1, MPEG-2, MPEG-4, H.261, H.263, and H.264 as well as non-standard codecs. In various embodiments, the fact that media packets have different value or importance, represented by profit or distortion values, and different size is exploited. Embodiments of the present invention use profit-to-size ratios or distortion-to-size ratios to represent the value of a media packet.

Each media bitstream, e.g., JPEG-2000 bitstream, is made of independently parsable media packets, e.g., JPEG-2000 packets, and allows successful decoding with just a subset of these packets; therefore, rate-reduction is possible by simply discarding packets. While embodiments of the present invention are described with reference to the JPEG-2000 coding standard, it should be appreciated that embodiments of the present invention may utilize other coding standards and methods such as those listed above that implement independently parsable packets.

Figure 2:
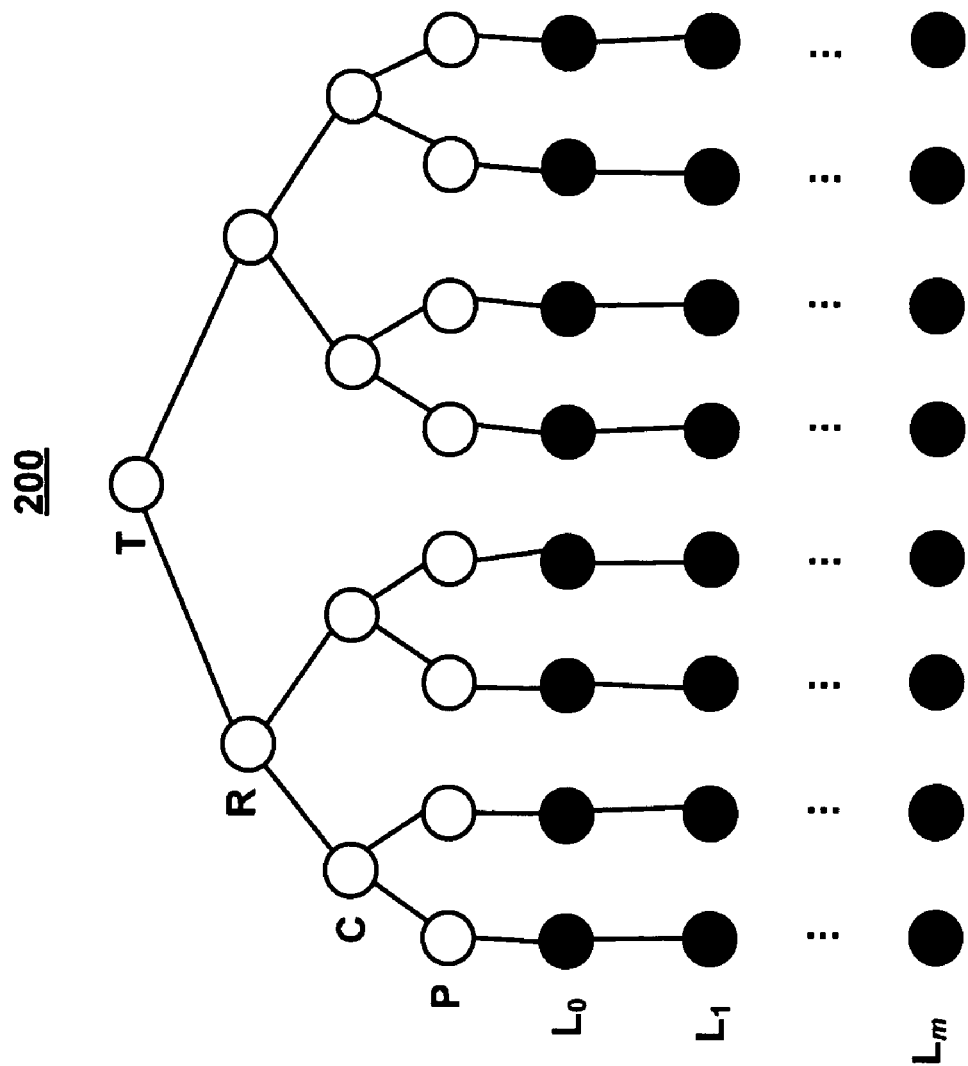
FIG. 2 is an example tree structure of scalable packet dependencies, in accordance with one embodiment of the present invention.

In one embodiment, JPEG-2000 coded images using mean-squared error (MSE) as a distortion measure are used. FIG. 2 is an example tree structure 200 of scalable packet dependencies, e.g., for JPEG-2000, in accordance with one embodiment of the present invention. Each JPEG-2000 packet contains data for a single tile (T), resolution level (R), color-component (C), precinct (P), and quality layer. More generally, in one embodiment, a tile is a media unit of a frame.

In one embodiment, a TRCP tag is defined as the set of JPEG-2000 packets (one for each quality layer) that belong to a specified JPEG-2000 tile, resolution level, color-component, and precinct (TRCP). It should be noted that the original ordering of encoding can vary as packets may be reordered by the scheduling of the described embodiments. It is assumed that JPEG-2000 packets across different TRCP tags are independent when using orthogonal filters, e.g., when 9/7 tap biorthogonal filters are used. However, this is not the case across quality layers, which are dependent in a linear fashion. FIG. 2 illustrates the dependencies of JPEG-2000 packets. The black circles are actual JPEG-2000 packets while the white circles are abstractions to show the JPEG-2000 structure. Note for n TRCP tags and m layers in each tag, the number of JPEG-2000 packets is k=mn.

In solving for rate-distortion (RD) schedules, the distortion values (and subsequently profit values) associated with each JPEG-2000 packet are used. Because of the linear dependence across layers, an additional packet is only useful if the layers above it within the same TRCP tag are also transmitted. Thus, the distortion vector d(x) is calculated by incrementally dropping the layers of TRCP tag x. The modified JPEG-2000 codestream is decoded and the mean-squared error between the modified and original image is calculated. d(x) is the amount the MSE increases the quality layers drop, which are computed by incrementally dropping packets, decoding, and calculating the resulting MSE. Analogously, p(x) is how much the MSE decreases as quality layers are added.

Embodiments of the present invention provide a novel modeling framework for RD optimization of JPEG-2000 images. In one embodiment, dynamic programming is used to find the schedules. By exploiting the dependency structure of JPEG-2000 packets, the described embodiments are able to beat the running time of PCKP. In one embodiment, the RD tradeoff serves as an important lower bound for all other scheduling algorithms.

Figure 3:
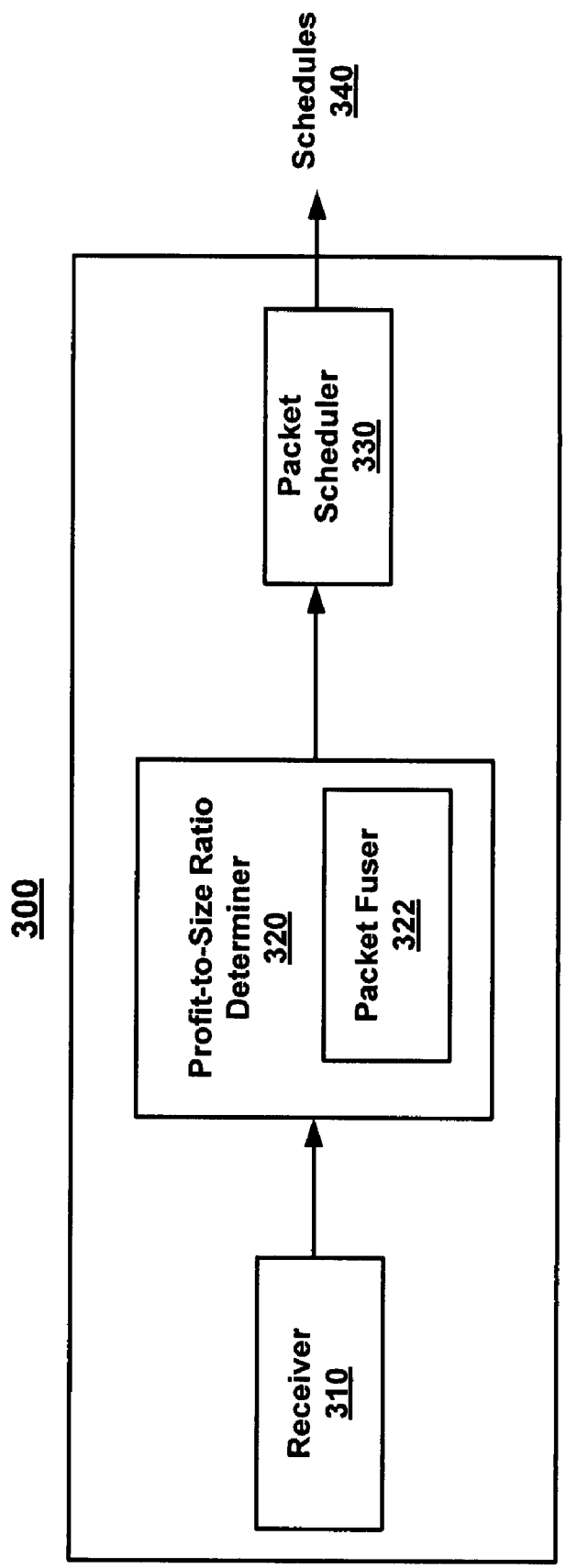
FIG. 3 is a block diagram of a system for scheduling packet transmission, in accordance with various embodiments of the present invention.

FIG. 3 is a block diagram of a system 300 for scheduling packet transmission, in accordance with various embodiments of the present invention. System 300 includes receiver 310, profit-to-size determiner 320, and packet scheduler 330. In one embodiment, profit-to-size determiner includes packet fuser 322. Packet scheduler 330 is operable to determine a plurality of schedules of data packets for a plurality of data rates based at least in part on the profit-to-size ratios utilizing dynamic programming. It should be appreciated that system 300 can be implemented as software, hardware, firmware, or any combination thereof. Moreover, it should be appreciated that system 300 may include additional components that are not shown so as to not unnecessarily obscure aspects of the embodiments of the present invention.

Embodiments of system 300 are operable to perform a process for scheduling packet transmission. FIG. 4 is a flowchart illustrating a process 400 for scheduling data packet transmission, in accordance with one embodiment of the present invention. In one embodiment, process 400 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 400 is performed by system 300 of FIG. 3.

At 410 of FIG. 4, a plurality of data packets are received, wherein at least a portion of the data packets are associated with one media unit, e.g., a tile, and comprise different quality information. In one embodiment, the data packets are packets in accordance with JPEG-2000 coding standard. In one embodiment, a data packet comprises information identifying an associated media unit, resolution level, color component, precinct, and quality level. In one embodiment, the plurality of data packets are received at receiver 310 of FIG. 3.

In one embodiment, the problem of finding RD schedules is formulated as an optimization problem. x is defined as the index of a TRCP tag. $l_x$ is defined as an indicator vector of the layers included in TRCP tag x. In one embodiment, due to the precedence constraint, $l_x$ can only take on values that have ones followed by all zeros, e.g., if m=3 then $l_x \in \{[0, 0, 0], [1, 0, 0], [1, 1, 0], [1, 1, 1]\}$. d(x) is defined as a length m vector where the $i^{th}$ element equals the change in distortion by not including the $i^{th}$ layer of TRCP tag x. p(x) is defined as a length m vector where the $i^{th}$ element equals the profit of the $i^{th}$ layer of TRCP tag x which is equivalent to the amount we decrease distortion by including that packet. s(x) is defined as a length m vector where the element equals the size of the layer of TRCP tag x.

At 420, profit-to-size ratios for the data packets are determined. In one embodiment, the profit-to-size ratios for the data packets are determined at profit-to-size ratio determiner 320 of FIG. 3. In one embodiment, as shown at 430, if a lower quality level packet associated with the media unit has a larger profit-to-size ratio than a higher quality layer packet associated with the media unit, the lower quality layer packet and the higher quality layer packet are fused into a fused packet. Given properties of the RD schedules, embodiments of the present invention provide for finding embedded schedules. Determination of embedded schedules runs in $\Theta(k \log k)$. In one embodiment, because schedules are fairly correlated, a method of fusing packets is used to find the embedded schedules. In one embodiment, the data packets are fused at packet fuser 322 of FIG. 3.

FIG. 5 is a flowchart illustrating a process 500 for fusing data packets, in accordance with one embodiment of the present invention. In one embodiment, process 500 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 500 is performed by packet fuser 322 of FIG. 3.

At 510, a first data packet and a second data packet associated with one media unit, e.g., a tile, are received, wherein the first data packet comprises lower quality information than the second data packet. At 520, profit-to-size ratios for the first data packet and the second data packet are determined. It should be appreciated that the fractional knapsack problem sorts the packets in decreasing order of their profit-to-size ratio. Packets are added to the schedule starting with the packet with the largest profit-to-size ratio and finally ending with the packet with the lowest profit-to-size ratio. However, with this approach it cannot be ensured the precedence constraint will be maintained.

At 530, if the first data packet has a larger profit-to-size ratio than the second data packet, the first data packet and the second data packet are fused into a fused data packet. For example, suppose a pair of Layer 1 and 0 packets violate the precedence constraint. One could either push the Layer 1 packet back to immediately precede its Layer 0 packet or pull the Layer 0 packet ahead to precede the Layer 1 packet. Another approach is to consider the packets as a single packet. By locking the two packets together, their fused profit-to-size ratio can be found, which is the sum of their profits divided by the sum of their sizes. This fused packet will never move ahead of the Layer 1 packet or behind the Layer 0 packet.

In one embodiment, as shown at 540, a signal-to-noise ratio for the fused data packet is determined. In one embodiment, the signal-to-noise ratio for the fused data packet comprises a sum of profits of the first data packet and the second data packet divided by a sum of sizes of the first data packet and the second data packet. For example, let $p_0$, $s_0$, and $p_1$, $s_1$ correspond to the profits and sizes of the Layer 0 and 1 packets, respectively. A problem occurs if Layer 1 precedes Layer 0, that is if $$\frac{p_1}{s_1} > \frac{p_0}{s_0}.$$

With some algebra, we can show that $$\frac{p_1}{s_1} > \frac{p_0 + p_1}{s_0 + s_1} > \frac{p_0}{s_0}.$$

If layers of the same TRCP tag will flip based on their profit-to-size ratio, the two packets are fused together and treated as one packet with a single profit-to-size ratio. The method of scheduling then proceeds using the fused packet. Because sorting can be done in $\Theta(k \log k)$, the running time of the fused-greedy algorithm is $\Theta(k \log k)$.

In one embodiment, as shown at 550, the fused packet is utilized in determining a plurality of schedules of data packets for a plurality of data rates based at least in part on profit-to-size ratios utilizing dynamic programming, e.g., is used in process 400.

With reference to FIG. 4, at 440, a plurality of schedules of the data packets for a plurality of data rates is determined based at least in part on the profit-to-size ratios. In one embodiment, as shown at 450, the plurality of schedules are determined utilizing dynamic programming. In one embodiment, the dynamic programming comprises a Precedence Constraint Knapsack Problem (PCKP). In one embodiment, the plurality of schedules, e.g., schedules 340, are determined at packet scheduler 330 of FIG. 3.

In one embodiment, considering the assumption that distortion values are additive, the distortion incurred the schedule defined by $l_x$ is $D=\Sigma_x d^T(x)l_x$. In terms of profit values p(x): $D=\Sigma_x p^T(x)1-\Sigma_x p^T(x)l_x$, where 1 is the vector of all ones. Accordingly, maximizing profit is equivalent to minimizing distortion. The optimization problem, as illustrated in Equation 1, becomes:

$$\max \sum_x p^T(x)l_x \quad (1)$$

$$s.t. \sum_x s^T(x)l_x \leq R$$

$$l_x \in [1, \ldots, 1, 0, \ldots, 0]$$

In one embodiment, this problem can be solved for a single rate using known solutions to the PCKP. The problem is formulated in a dynamic programming framework which allows solving this problem for rates 1, 2, . . . , R in one execution.

Let A(i,j), defined by Equation 2, be the maximum profit that can be achieved with rate j and schedule of TRCP tags 1 to i. Let B(i,j), defined by Equation 3, be the maximum profit with rate j that uses TRCP tag i and the combination of tags 1 to i−1. The profit for rate r will be given by A(n, r), for r=1, 2, . . . , R. Maintaining the schedules that achieve these profits in a table will give the corresponding schedule, S(n, r).

$$A(i, j) = \begin{cases} 0, & i = 0 \text{ or } j = 0; \\ A(i-1, j), & s^T(i)[1, 0, \ldots, 0] \geq R; \\ \max\{A(i-1, j), B(i, j)\}, & \text{otherwise.} \end{cases} \quad (2)$$

$$B(i, j) = \max_{l_i} \{A(i-1, j - s^T(i)l_i) + p^T(i)l_i\} \quad (3)$$

The first case in A(i,j) is when nothing is sent. The second case is when the top layer of tag i is too big to fit, so no packets from TRCP tag i are used. The third case decides whether or not to use TRCP tag i. The precedence properties of the layers are maintained by maximizing B(i,j) over allowable layer combinations within TRCP tag i.

In one embodiment, as shown at 442, a plurality of schedules of the data packets is determined for a plurality of data rates based at least in part on a quality information precedence constraint of the data packets. In one embodiment, as described above and shown at 450, dynamic programming is used to determine the plurality of schedules. In one embodiment, the precedence constraint requires that a schedule comprising a higher quality level packet associated with the media unit also comprises at least a lower quality level packet associated with the media unit. In one embodiment, as shown at 452, the data packets are arranged in order of profit-to-size ratio. At 454, the PCKP is solved for the data packets.

The dynamic programming provides the resulting RD curves and the schedules for each rate. In one embodiment, using the dynamic programming in Equation 2, the schedule that corresponds to the distortion value for each rate is found. Looking over all of these schedules, the frequency of a packet is defined as the number of times the packet was used in all of the schedules. In one embodiment, the solution to the fractional knapsack problem uses profit-to-size ratios, which are defined as p(x)/s(x) for packet x.

The precedence constraint requires that quality layers of packets for the same media unit are dependent on each other. A schedule including a higher level packet associated with a media unit must also include all lower level packets associated with the same media unit. It should be appreciated that the due to the dependencies across layers, a lower layer packet (e.g., $L_0$ of FIG. 2) may be used more often simply to allow the more important higher layer packet (e.g., $L_1$ of FIG. 2) to be included.

Embodiments of the present invention formulate the problem of finding RD schedules as a dynamic program. By looking at the schedules, it is evident that the precedence constraint may effect the policy. Some packets which otherwise would not be important are used very frequently because other packets are dependent on them. By solving for the schedule, there is now a tight lower bound for all possible schedules.

At 460, a set of embedded schedules is determined based at least in part on the plurality of schedules, wherein an embedded schedule for a particular rate includes packets for the particular rate and packets for lower rates. Schedules that are embedded within each other is beneficial for real world applications such as rapidly adapting the packet selection for dynamic network conditions. In one embodiment, the present invention provides for finding a set of embedded schedules for all rates. In one embodiment, the set of embedded schedules is determined at packet scheduler 330 of FIG. 3.

Suppose there are two schedules, $S(R_1)$ and $S(R_2)$, with corresponding rates, $R_1$ and $R_2$ such that $R_1<R_2$. The correlation, C, between $S(R_1)$ and $S(R_2)$ is defined as the fraction of packets from $S(R_1)$ that are contained in $S(R_2)$. In other words, $C[S(R_1)$, $$S(R_2)] = \frac{|S_{opt}(R_1) \cap S_{opt}(R_2)|}{S_{opt}(R_1)}.$$

If all the packets of $S(R_1)$ are in $S(R_2)$, then the schedules are fully embedded and correlation is 1.

The average correlation between schedules is plotted as a function of the change in rate, $R_2-R_1$. At low rates, the solution will select very small packets that are likely to have low profit-to-size ratios because they are the only packets that will fit in the rate constraint. As $\Delta R$ increases, $R_1$ is low and the packets in $S(R_1)$ are unlikely to be in $S(R_2)$. However, at high $\Delta R$, there is an increase in average correlation. This is because $R_2$ is large and nearly all packets in the image are in $S(R_2)$. This implies that nearly all of the packets of $S(R_1)$ are also included. The sharp decrease in average correlation at extremely large $\Delta R$ is again due to the very small packets in $S(R_1)$. With such large $\Delta R$, it is likely that there is only one or two packets in S(Ri). Because these packets are so small they will be among the last packets incorporated into $S(R_2)$. And because there are so few packets at $R_1$, if they are not included, the correlation drops significantly.

How the correlation of schedules varies as a function of rate with $\Delta R$ fixed is also considered, e.g., the schedules for R and R+$\Delta R$ are examined as R varies. In one embodiment, as the rate increases, new packets can be added. In one embodiment, small packets are added until there is enough rate to kick out and replace them with a larger, more important packet. This is what decreases the correlation. Also, some TRCP tags have very small packets. So, with incremental increase in rate, Layer 0 of this tag will be added, followed by Layer 1 and finally Layer 2. Because these packets are so small they are generally not in $S(R_2)$.

In summary, embodiments of the present invention provide for the scheduling of packet transmission for different transmission rates. In various embodiments, the present invention provides for selection of schedules that minimize distortion subject to varying rate constraints. Embodiments of the present invention utilize dynamic programming by solving the PCKP for multiple rates, subject to the dependency constraints of the packets. In one embodiment, packets that are in violation of the dependency constraint are fused together for use in generating embedded schedules. These embedded schedules have the property that all the packets in lower rate schedules are included in higher rate schedules. For instance, embedded schedules enable low-complexity, adaptive streaming.

Various embodiments of the present invention, scheduling packet transmission, are thus described. While the present invention has been described in particular embodiments, it should be appreciated that the present invention should not be construed as limited by such embodiments, but rather construed according to the below claims.

What is claimed is:

1. A computer-implemented method for scheduling packet transmission, said method comprising:
   receiving a plurality of data packets at a computer, wherein at least a portion of said plurality of data packets is associated with a media unit and comprises different quality information, said different quality information comprising a tile, a resolution level, a color component, a precinct and a quality level;
   determining by said computer profit-to-size ratios or distortion-to-size ratios for said plurality of data packets based on said different quality information, wherein said profit-to size ratios and said distortion-to-size ratios represent a value of said plurality of data packets;
   discarding one or more data packets of said plurality of data packets to reduce a data transmission rate of said plurality of data transmission packets that remain non-discarded; and
   determining by said computer a plurality of schedules of said plurality of data packets for a plurality of data transmission rates based at least in part on said profit-to-size ratios or distortion-to-size ratios, and wherein a schedule of said plurality of schedules is an order of data packets to be transmitted.

2. The computer-implemented method of claim 1 wherein said data packets are selected from a listing consisting essentially of: audio-based data packets, image-based data packets, graphics data packets, video-based data packets, text-based data packets, and web page-based data packets.

3. The computer-implemented method of claim 1 wherein said determining a plurality of schedules of said data packets for a plurality of data transmission rates based at least in part on said profit-to-size ratios or distortion-to-size ratios comprises:
   utilizing by said computer dynamic programming methods to determine said plurality of schedules.

4. The computer-implemented method of claim 3 wherein said dynamic programming comprises a Precedence Constraint Knapsack Problem (PCKP).

5. The computer-implemented method of claim 4 wherein said determining a plurality of schedules of said data packets for a plurality of data transmission rates based at least in part on said profit-to-size ratios or distortion-to-size ratios comprises:
   arranging by said computer said data packets in order of profit-to-size ratio; and
   for said plurality of data transmission rates, solving by said computer said PCKP.

6. The computer-implemented method of claim 1 further comprising:
   determining by said computer a set of embedded schedules based at least in part on said plurality of schedules, wherein an embedded schedule for a particular transmission rate comprises packets for said particular transmission rate and packets for lower transmission rates.

7. The computer-implemented method of claim 1 wherein said determining a plurality of schedules of said data packets for a plurality of data transmission rates based at least in part on said profit-to-size ratios or distortion-to-size ratios comprises:
   determining a plurality of schedules of said data packets for a plurality of data transmission rates based at least in part on a quality information precedence constraint of said data packets, wherein a schedule comprising a higher quality level packet associated with said media unit also comprises at least a lower quality level packet associated with said media unit.

8. The computer-implemented method of claim 1 further comprising:
   if a lower quality level packet associated with said media unit has a larger profit-to-size ratio or distortion-to-size ratio than a higher quality layer packet associated with said media unit, fusing by said computer said lower quality layer packet and said higher quality layer packet into a fused packet.

9. The computer-implemented method of claim 1 wherein said plurality of data packets are packets in accordance with JPEG-2000 coding standard.

10. A computer-implemented method for fusing data packets, said method comprising:
    receiving at a computer a first data packet and a second data packet associated with one media unit, wherein said first data packet comprises lower quality information than said second data packet, wherein said quality information comprises a tile, a resolution level, a color component, a precinct and a quality level;
    determining by said computer a profit-to-size ratio or distortion-to-size ratio for said first data packet and said second data packet based on said quality information, wherein said profit-to-size ratios and said distortion-to-size ratios represent a value of said first data packet and said second data packet; and
    if said first data packet has a larger profit-to-size ratio or distortion-to-size ratio than said second data packet, fusing by said computer said first data packet and said second data packet into a fused data packet.

11. The computer-implemented method of claim 10 further comprising:
    determining by said computer a signal-to-noise ratio for said fused data packet.

12. The computer-implemented method of claim 11 wherein said signal-to-noise ratio for said fused data packet comprises a sum of profits or distortions of said first data packet and said second data packet divided by a sum of sizes of said first data packet and said second data packet.

13. The computer-implemented method of claim 10 further comprising:
utilizing by said computer said fused packet in determining a plurality of schedules of data packets for a plurality of data transmission rates based at least in part on profit-to-size ratios or distortion-to-size ratios.

14. The computer-implemented method of claim 13 wherein said utilizing said fused packet in determining a plurality of schedules of data packets for a plurality of data transmission rates based at least in part on profit-to-size ratios or distortion-to-size ratios comprises:
utilizing dynamic programming in determining said plurality of schedules.

15. The computer-implemented method of claim 10 wherein said first data packet, said second data packet and said fused data packet are in accordance with JPEG-2000 coding standard.

16. One or more computing device readable media for storing instructions that when executed by one or more processors perform a method for scheduling packet transmission, said method comprising
receiving a plurality of data packets, wherein at least a portion of said plurality of data packets is associated with one media unit and comprises different quality information, said different quality information comprising a tile, a resolution level, a color component, a precinct and a quality level;
determining profit-to-size ratios for said plurality of data packets based on said different quality information, wherein said profit-to-size ratios represents a value of said plurality of data packets; and
if a data packet associated with a particular media unit and comprising lower quality information has a larger profit-to-size ratio or distortion-to-size ratio than a data packet associated with said particular media unit and comprising higher quality information, fusing said data packet associated with said particular tile and comprising said lower quality information with said data packet associated with said particular media unit and comprising said higher quality information into a fused packet;
determining a plurality of schedules of said data packets for a plurality of data transmission rates based at least in part on said profit-to-size ratios or distortion-to-size ratios and on a quality information precedence constraint of said data packets, and wherein a schedule of said plurality of schedules is an order of data packets to be transmitted.

17. The one or more computing device readable media as recited in claim 16 wherein said quality information precedence constraint of said data packets requires that a schedule comprising a data packet associated with a media unit and comprising higher quality information also comprises at least a data packet associated with said media unit and comprising lower quality information.

18. The one or more computing device readable media as recited in claim 16 wherein said determining a plurality of schedules of said data packets for a plurality of data rates based at least in part on said profit-to-size ratios or distortion-to-size ratios and on a quality information precedence constraint of said data packets is performed utilizing dynamic programming.

* * * * *

UNITED STATES PATENT AND TRADEMARK OFFICE
CERTIFICATE OF CORRECTION

PATENT NO.       : 7,684,331 B2
APPLICATION NO.  : 11/787609
DATED            : March 23, 2010
INVENTOR(S)      : Carri Chan et al.

It is certified that error appears in the above-identified patent and that said Letters Patent is hereby corrected as shown below:

In column 9, line 39, in Claim 1, delete "profit-to size" and insert -- profit-to-size --, therefor.

Signed and Sealed this

Fifth Day of October, 2010

David J. Kappos
*Director of the United States Patent and Trademark Office*